United States Patent [19]

Kerber

[11] Patent Number: 4,538,466
[45] Date of Patent: Sep. 3, 1985

[54] CAPACITANCE PRESSURE TRANSDUCER AND METHOD OF FABRICATION THEREFOR

[76] Inventor: George L. Kerber, 4611 Lisann St., San Diego, Calif. 92117

[21] Appl. No.: 577,166

[22] Filed: Feb. 6, 1984

[51] Int. Cl.³ .......................... G01L 9/12; H01G 7/00
[52] U.S. Cl. .................................... 73/724; 29/25.41; 361/283
[58] Field of Search ........................ 73/708, 724, 718; 361/283; 128/675; 29/595, 832, 25.41

[56] References Cited

U.S. PATENT DOCUMENTS

| 3,405,559 | 10/1968 | Moffatt | 73/724 |
| 3,750,476 | 8/1973 | Brown | 73/724 |
| 4,064,549 | 12/1977 | Cretzler | 73/724 |

Primary Examiner—Donald O. Woodiel
Attorney, Agent, or Firm—Morland C. Fischer

[57] ABSTRACT

A capacitance pressure transducer comprising two fused quartz cylinders concentrically aligned with and separated from one another so that a small gap is established therebetween. The capacitance of the transducer is determined by the size of the gap and the length of capacitor electrodes which are disposed within the gap. Changes in capacitance are measured by an external circuit which is connected to the electrodes. The electrodes are attached to respective opposing surfaces of the inner and outer cylinders and responsive to pressure induced changes in the size of the gap. The cylinders are connected together by means of a unique joint formed between respective first ends thereof, so that the inner disposed cylinder is adapted to be cantilevered from the joint and suspended within the outer cylinder. That is, the first ends of each cylinder are formed with an identical taper. The inner cylinder is located within the outer cylinder, such that the respective first ends thereof form a close or flush fit relative to one another. The joint to bond the first cylinder ends together is formed by a metal (e.g. titanium) hydride solder process. A fused quartz-to-fused quartz seal is formed by the steps of supplying a mixture of an indium alloy solder and titanium hydride to the first ends of the inner and outer cylinders and heating the cylinders in a vacuum chamber. The titanium hydride acts as a flux for promoting a continuous and reliable solder joint between the first cylinder ends.

21 Claims, 6 Drawing Figures

CAPACITANCE PRESSURE TRANSDUCER AND METHOD OF FABRICATION THEREFOR

BACKGROUND OF THE INVENTION

1. Field of the Invention

This invention relates to an apparatus and method for implementing a capacitance pressure transducer comprising two fused quartz cylinders that are connected together at respective first ends and concentrically aligned relative to one another so that the capacitance of the transducer can be determined by the size of the gap which is established between the cylinders. The present pressure transducer has a particular application to be lowered into an oil or gas well for accurately sensing subsurface pressure conditions therein.

2. Prior Art

Capacitance pressure transducers comprising a pair of fused quartz cylinders that are concentrically aligned relative to one another so that a gap is formed therebetween are known to the prior art. However, the cylinders of such transducers are connected together at each of the first and opposite ends thereof. The conventional technique by which to interconnect the cylinders commonly includes a step of direct fusion or welding. Characteristic of such a direct fusion technique is the relatively high fusing temperatures (e.g. approximately 1600 degrees C.) required for melting fused quartz and for forming a fused quartz-to-fused quartz bond between the cylinders. However, such characteristic high temperatures are deleterious to a suitable fabrication of a fused quartz capacitance pressure transducer.

More particularly, the cylinders and especially the inner cylinder, have been known to crack at both ends thereof during the cooling phase of the pressure transducer fabrication technique. The likeihood of cracking is increased as a consequence of any asymmetrical alignment of the cylinders at opposite ends of the transducer. An attempt to eliminate the undesirable cracking has included thickening both ends of the transducer. However, such attempt has proven to be both time consuming and relatively costly.

Moreover, because of the high thermal conductivity of quartz, the (e.g. metal film) electrodes thereof have been known to either experience a change in characteristics or peel away from the cylinder surfaces to which they are applied during exposure to the high fusing temperatures. What is more, the high fusing temperatures sometimes cause an undesirable distortion in the configuration of the inner and/or outer cylinder, because quartz has a tendency to become plastic at temperatures in the order of 1600 degrees C. Any non-concentricity in the inner cylinder is reflected as a shear or tensile stress thereon when the outer cylinder is pressurized. Inasmuch as quartz can only tolerate relatively low shear and tensile stresses, the inner cylinder may crack during pressurization. The likelihood of non-concentricity is amplified when the inner and outer cylinders are connected together at both ends, as is common to the geometry of conventional capacitance pressure transducers.

Examples of capacitance pressure transducers which are illustrative of the foregoing conventional geometry and fabrication techniques may be found while referring to one or more of the following United States patents:

U.S. Pat. No. 3,750,476, Aug. 7, 1983.
U.S. Pat. No. 4,064,549, Dec. 20, 1977.

Metal hydride processes have previously been known to those skilled in the art. For example, the article entitled "Active-Metal Soldering of Crystalline Quartz", M. E. Knoll, REVIEW OF SCIENTIFIC INSTRUMENTS, Vol. 32, No. 1, January, 1961, relates to a technique for applying electrodes to quartz crystal resonators. Moreover, a metal hydride technique is sometimes used in the preparation of ceramic-to-metal seals on vacuum tubes and vacuum apparatus. For a generalized discussion of a metal (e.g. titanium) hydride technique as described above, reference may be made to VACUUM SEALING TECHNIQUES, A. Roth, Pergamon Press, Ltd., 1966 at page 211. However, the application of a metal hydride technique has been limited to the fusing of metal to a ceramic. Nothing is known in the prior art which relates to a process for interconnecting two pieces of fused quartz or glass by means of a metal hydride solder process, as is described and claimed hereinafter.

SUMMARY OF THE INVENTION

The present invention overcomes the difficulties inherent in the conventional capacitance pressure transducer geometry and fabrication. More particularly, the inner and outer fused quartz cylinders are connected together at identically tapered first ends only, such that one of the former connections between the cylinders at the opposite ends thereof is now eliminated. The inner cylinder is adapted to be suspended within and cantilevered from the outer cylinder at a unique joint that is formed between the first tapered ends and achieved by means of a metal hydride solder process. A transducer geometry including the interconnection of each of the inner and outer cylinders at a single end eliminates the source of the tensile or shear stress and thereby reduces the likelihood of cracking, as has been experienced by capacitance pressure transducers of the prior art.

The metal hydride solder process includes the steps of painting the annulus formed between the first tapered ends of the inner and outer cylinders with a mixture of titanium hydride and amylacetate. A suitable solder is then laid in the annulus, and the solder and titanium hydride are heated to a temperature of approximately 600 degrees C. The titanium hydride acts as a flux for the solder, so that a continuous and reliable fused quartz-to-fused quartz solder joint can be formed between the respective first tapered ends of the inner and outer transducer cylinders.

By virtue of the metal hydride solder process, the presently disclosed pressure transducer is subjected to lower fabricating temperatures (e.g. 600 degrees C.) than those temperatures (1600 degrees C.) that are typically associated with the direct fusion or welding fabrication of conventional pressure transducers which, unlike a solder or braising process, require the temperature for heating the transducer structure to be raised in order to change the quartz into a molten or plastic state which is suitable for interconnecting the capacitor ends. Thus, the present transducer will be less susceptible to distortion and cracking during the fabrication thereof. Moreover, the original characteristics and integrity of the metal electrodes at the inner and outer cylinder surfaces can be better preserved.

DESCRIPTION OF THE PREFERRED EMBODIMENTS

Figure 1:
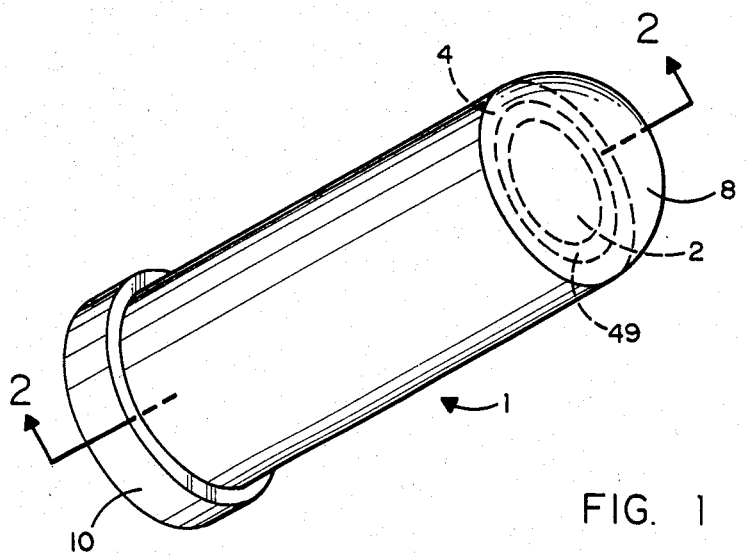
FIG. 1 is a perspective view of a capacitance pressure transducer which forms a first preferred embodiment of the present invention.

Referring to the drawings, FIGS. 1-4 show the geometry for a capacitance pressure transducer 1 which is fabricated in accordance with a first preferred embodiment of the present invention. Pressure transducer 1 comprises a solid, cylindrical inner post 2 and a hollow outer cylinder 4. Each of the inner post 2 and outer cylinder 4 is preferably fabricated from a fused quartz material. The inner post and outer cylinder are concentrically aligned relative to one another, so that a small gap 6 is established therebetween whereby a pressure sensitive capacitor assembly can be formed. The capacitance of pressure transducer 1 is determined by the length of a pair of soon to be described electrodes and the width of gap 6 which extends in a direction between inner post 2 and outer cylinder 4 and changes as a function of pressure. The initial size of gap 6 and the thickness of outer cylinder 4 are selected depending upon the range of pressure over which the transducer 1 is to be responsive. By way of example, gap 6 is provided with a width of approximately 0.002 inches and outer cylinder 4 is provided with a thickness of approximately 0.875 inches, so that pressure transducer 1 is responsive to a range of pressures extending from 0-10,000 psi.

The capacitor assembly comprising inner post 2 and outer cylinder 4 is interconnected between a pressure dome 8 and a base 10. That is, inner post 2 and outer cylinder 4 are connected together and to pressure dome 8 at a joint 12. The formation of a particular joint 12, which forms an important part of the present invention, will be described in greater detail hereinafter. One end of inner post 2 is spaced from the pressure dome 8 by a separation 14 so as to prevent pressure dome 8 from contacting and possibly displacing inner post 2 relative to outer cylinder 4. By way of example, the separation 14 which extends in a direction between inner post 2 and pressure dome 8 has a width of approximately 0.025 inches. Pressure dome 8 is preferably fabricated from a fused quartz material and is provided with a hemispherical configuration, so as to protect the interior of transducer 1. However, it is to be understood that pressure dome 8 may be fabricated from any suitable material and provided with any other convenient (e.g. rectangular) configuration.

Figure 2:
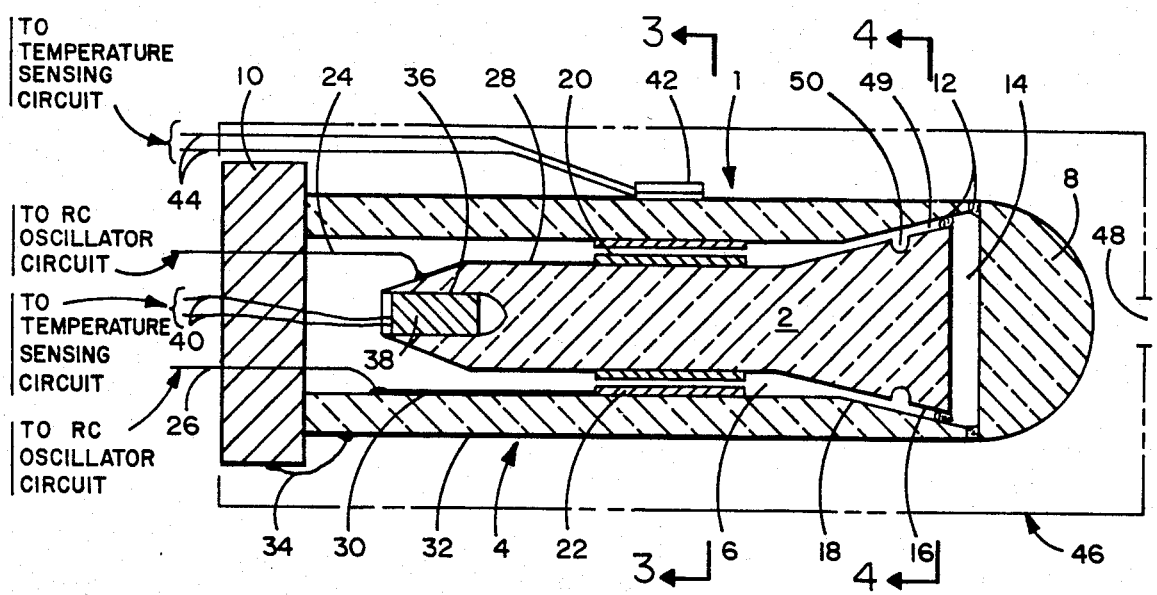
FIG. 2 is a cross section taken along lines 2—2 of FIG. 1.
Figure 3:
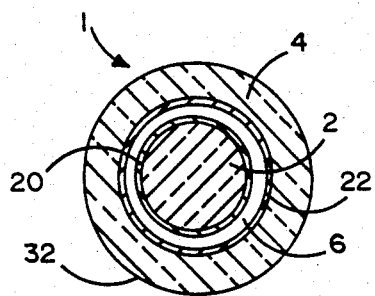
FIG. 3 is a cross section taken along lines 3—3 of FIG. 2.
Figure 4:
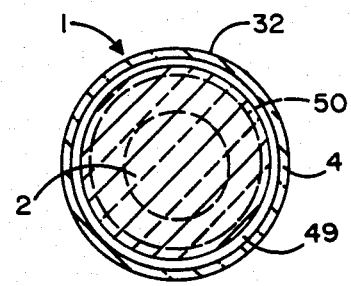
FIG. 4 is a cross section taken along lines 4—4 of FIG. 2.

In accordance with an important aspect of the present invention and as is best illustrated in FIG. 2, inner post 2 is connected to outer cylinder 4 at a single end of pressure transducer 1. That is, the soon to be described joint 12 for connecting inner post 2 and outer post 4 together is correspondingly located at single, first ends of such post and cylinder. Thus, the centrally disposed inner post 2 is suspended within and cantilevered from the first end of the outer cylinder 4 at the joint 12. Moreover, the second end of outer cylinder 4 is secured to the base 10, while the second end of inner post 2 is shortened and, thereby, spaced from base 10. Base 10 can be fabricated from stainless steel and provided with a circular configuration, although it is to be recognized that base 10 may be fabricated from any suitable material (e.g. a fused quartz, or a low expansion metal, such as invar) and provided with any convenient configuration.

In order to facilitate the aforementioned cantilevered connection of inner post 2 to outer post 4, first ends of each such post and cylinder are provided with a tapered configuration. More particularly, the first end of inner post 2 is provided with a taper 16 which is identical to the corresponding taper 18 of the first end of outer cylinder 4. Accordingly, the tapered ends 16 and 18 of inner post and outer cylinder 4 are closely spaced from one another so as to form a small annulus 49 therebetween. The close fit of the tapered first ends 16 and 18 of inner post 2 and outer cylinder 4 is reinforced by a formation of the soon to be described joint 12 at the annulus 49.

A pair of cylindrical capacitor electrodes are concentrically arranged relative to one another at the interior of pressure transducer 1, so as to provide an indication of a change in pressure corresponding to a change in the size (i.e. width) of gap 6. More particularly, electrodes 20 and 22 are respectively applied, in face-to-face alignment, along intermediate portions of the axial lengths of inner post 2 and outer cylinder 4. Each of the electrodes 20 and 22 is preferably fabricated from a noble metal (e.g. platinum) thin film and provided with dimensions of approximately one inch in length and 1,000 Å in thickness. Electrodes 20 and 22 are associated with transducer output leads 24 and 26. Output leads 24 and 26 are electrically connected to respective electrodes 20 and 22 by way of an electrically conductive thin (e.g. platinum) film 28 and 30, which thin film is applied to the surfaces of inner post 2 and outer cylinder 4 between electrodes 20 and 22 and leads 24 and 26. The transducer output leads 24 an 26 are connected exterior of transducer 1 to input terminals of a conventional resistance-capacitor oscillator circuit (not shown), the frequency of which is made proportional to the pressure sensed by transducer 1. A change in capacitance between inner post 2 and outer cylinder 4 is therefore reflected by a shift in frequency of the resistance-capacitance oscillator circuit.

The pressure transducer 1 is surrounded by a ground shield 32. The ground shield 32 is preferably an electrically conductive platinum film which covers the outer cylinder 4 and pressure dome 8. Ground shield 32 is electrically connected to and grounded at the (stainless steel) base 10 by means of a ground wire 34.

The second (i.e. suspended) end of inner post 2 has a short hole 36 formed therein. Inserted and secured within hole 36 is a temperature sensing element (e.g. thermistor) 38. Sensing element 38 is responsive to the temperature of the inner post 2 at a location interior of transducer 1. A pair of output leads 40 extend from sensing element 38 to the exterior of pressure transducer 1 for connection to input terminals of a conventional temperature sensing circuit (not shown). Another temperature sensing element (e.g. thermistor) 42 is secured (e.g. glued) to the outer wall of cylinder 4. Sensing element 42 is responsive to the temperature of the outer cylinder 4 at a location exterior of transducer 1. A pair of output leads 44 extends from sensing element 42 for connection at other input terminals of the aforementioned temperature sensing circuit. Ideally, and as will be recognized by those skilled in the art, it is preferable that inner post 2 and outer cylinder 4 be of identical temperature, so as to avoid temperature related changes to the size of gap 6. Therefore, temperature sensing elements 38 and 42 provide an indication of any temperature difference between the inner post 2 and outer cylinder 4 at locations interior and exterior of pressure transducer 1, so that appropriate pressure correction for undesirable thermal gradients can be accomplished, whereby to preserve the accuracy of pressure transducer 1. By way of example, pressure measurements with corresponding corrections (relative to temperature gradients and absolute temperature) can be computed mathematically by means of suitable computer software.

An optional pressure housing 46 may be attached to and sealed against base 10, so that housing 46 surrounds outer cylinder 4 and pressure dome 8. Housing 46 is filled with a suitable fluid, such as oil or air. A pressure port 48 is formed through pressure housing 46, so that pressure transducer 1 may communicate with the environment external to housing 46. By way of example, pressure housing 46 may be eliminated in applications where pressure transducer 1 is to be lowered into a subsurface oil or gas well for sensing pressure therein.

In accordance with another important aspect of the present invention, a metal hydride solder process for forming the aforementioned joint 12 and connected together the tapered first ends 16 and 18 of inner post 2 and outer cylinder 4 is now disclosed in detail. The present process advantageously avoids the relatively high temperatures of approximately 1,600 degrees C. that are commonly associated with the melting and fusing together of opposite ends of quartz cylinders which form conventional capacitance pressure transducers.

Prior to transducer assembly, the electrodes 20 and 22 are deposited at opposing surfaces of the inner post 2 and outer cylinder 4 of capacitance transducer 1 by means of sputtering, or the like and an organo-metallic deposition technique. By virtue of the close fit therebetween, the inner post and outer cylinder are retained in concentric alignment with one another when in the assembled relationship. As the capacitor assembly is rotated, a mixture of titanium hydride and amylacetate is painted with a small brush to wet the annulus 49 which is formed at the interface of the tapered first ends 16 and 18. Although titanium hydride is disclosed herein, it is to be understood that other suitable metal (e.g. zirconium) hydrides may be substituted therefor. The titanium hydride is a powder which has a grain size of three to five micrometers. The aforementioned mixture of titanium hydride and amylacetate is composed of approximately ten grams of titanium hydride for every ten milliliters of amylacetate.

After the tapered ends 16 and 18 have been painted, pieces of a suitable metal solder having a size approximately 0.125 inches in length are laid in the annulus 49. A suitable solder for the present process is an indium alloy 164 having a melting temperature of approximately 300 degrees C. Such a solder is available from the Indium Corporation of America. When the titanium hydride has dried (i.e. the amylacetate evaporates out after exposure to air), the capacitor assembly is placed in a vacuum chamber and heated by a suitable heater (e.g. a tantalum strip heater) to approximately 600 degrees C. The vacuum chamber is initially pumped down to a range of $10^{-7}$ torr.

During heating, the titanium hydride decomposes into pure titanium and hydrogen gas. Some pure titanium reacts with the oxygen in the fused quartz to form a chemical bond therebetween. The melted indium solder alloys with excess titanium. Accordingly, a joint (designated 12 in FIG. 2) is formed which is believed to be a quartz titanium oxide-titanium solder joint. In the present process, the titanium hydride acts as a flux for promoting a continuous and reliable fused quartz-to-fused quartz solder joint. Therefore, the inner post 2 and outer cylinder 4 can be connected together at the tapered ends 16 and 18 thereof using a soft solder plus titanium hydride flux to form an improved joint 12 which has been found to be generally as strong as the quartz which forms the capacitor assembly.

To stop the titanium hydride and solder from running completely down the annulus 49 between the tapered ends 16 and 18 and thereby prevent the electrodes 20 and 22 of the capacitor assembly from shorting together as a result, a small groove 50 is formed circumferentially around the inner post 2 at the tapered end 16 thereof. Hence, the titanium hydride and solder mixture will wick down annulus 49 only as far as groove 50.

As will be known to those skilled in the art, solder will not typically adhere to glass or quartz. However, it has been discovered that if the glass or fused quartz is first wetted with a suitable metal (e.g. titanium) flux, then a chemical bond is formed between the fused quartz and some of the titanium. Moreover, the remainder of the titanium alloys with the solder so as to be capable of forming a strong fused quartz-to-fused quartz joint between inner post 2 and outer cylinder 4.

By virtue of the presently disclosed soldering process, a fused quartz pressure transducer having a unique geometry can be provided that is substantially free from the problem of cracking which has heretofore been known to occur at the ends of a conventional pressure quartz transducer during fabrication and operation. Moreover, with the present soldering method, the high temperatures (e.g. approximately 1600 degrees C.) which are commonly associated with the prior art direct fusion process for interconnecting the inner and outer cylinders can be avoided. Thus, the concentric alignment of the inner post 2 and outer cylinder 4 can be better preserved, while the distortion of the cylindrical configuration thereof can be prevented. What is even more, a strong, continuous joint 12 can be formed to secure inner post 2 and outer cylinder 4 together at first tapered ends thereof without damaging the metal film electrodes 20 and 22.

Figure 5:
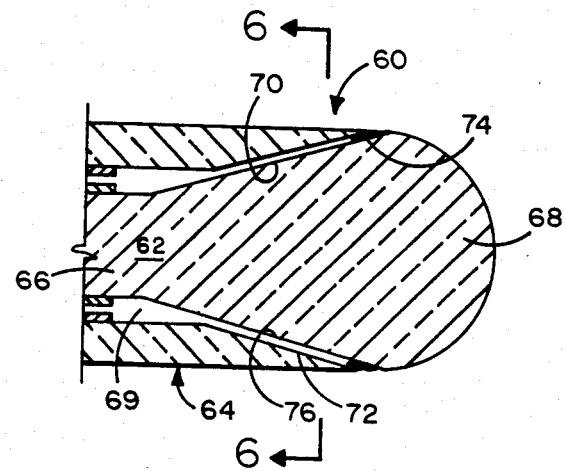
FIG. 5 is a partial cross section taken longitudinally through a pressure transducer which forms a second preferred embodiment of the present invention.
Figure 6:
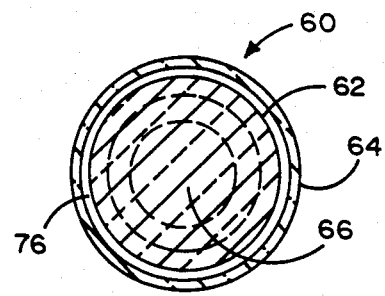
FIG. 6 is a cross section taken along lines 6—6 of FIG. 5.

FIGS. 5 and 6 of the drawings, show the geometry for a capacitance pressure transducer which is fabricated in accordance with a second preferred embodiment of the present invention. Pressure transducer 60 comprises a solid, cylindrical inner post 62 and a hollow outer cylinder 64. Each of the inner post 62 and outer cylinder 64 is preferably fabricated from a fused quartz material. The inner post 62 includes a straight section 66 which is oppositely and integrally connected with a protective pressure dome section 68. The inner post and outer cylinder are concentrically aligned relative to one another, so that a small gap 69 is established between the straight section 66 of inner post 62 and outer cylinder 64, whereby a pressure sensitive capacitor assembly can be formed.

Pressure transducer 60 may be characterized by a self-aligned or taper fit capacitor assembly. More particularly, inner post 62 has a taper 70 formed at a first domed end thereof, and outer cylinder 64 has a matching taper 72 formed at a corresponding first end thereof. When the inner post 62 and outer cylinder 64 are fit together, the matching tapers 70 and 72 slide into one another such that the straight section 66 of inner post 62 is automatically maintained in nearly concentric alignment with outer cylinder 64. By accurately machining (e.g. grinding) the tapers 70 and 72, the concentricity can be held at approximately 0.0001 inches. When the tapered first ends of inner post 62 and outer cylinder 64 are joined together and lapped, an improved joint 74 may be formed at the interface 76 therebetween by means of the hereinabove disclosed titanium hydride solder process. Alternatively, the tapered first ends of inner post 62 and outer cylinder 64 may be secured together by either of the well-known techniques of fritting, direct fusion or ringing (i.e. press fitting). Thus, the straight section 66 of inner post 62 is suspended within and cantilevered from a single tapered end 72 of of outer cylinder 64, so that shear or tensile stresses to which the inner post is commonly subjected can be substantially eliminated during the pressurization of the outer cylinder.

It will be apparent that while the preferred embodiments of the invention have been shown and described, various modifications and changes may be made without departing from the true spirit and scope of the invention. For example, by virtue of the disclosed capacitor geometry and metal hydride solder process for connecting the capacitor cylinders at respective first ends, a compact and rugged transducer assembly is available for applications which are generally inaccessible to conventional pressure transducers. By way of example, the pressure transducer herein disclosed has particular application for accurately sensing small pressure fluctuations in a subsurface oil or gas well when a downhole pressure is applied to the outer transducer cylinder causing both a compression thereof and a corresponding change in the gap size. What is more, although the present metal hydride solder process has been disclosed for interconnecting the first ends of the capacitor cylinders, it is to be understood that such process is similarly applicable to the fabrication of a capacitor assembly in which both the first and opposite ends of the capacitor cylinders are interconnected.

Having thus set forth the preferred embodiments, what is claimed is:

1. A capacitance pressure transducer comprising cylindrical inner and outer members separated from one another by a gap, the size of which gap is adapted to change as a function of pressure, and electrode means located at said inner and outer members and responsive to the size of said gap for providing an indication of pressured, respective first ends of said inner and outer members connected to one another at a joint formed therebetween such that the second end of said inner member is cantilevered from said joint and suspended within said outer member.

2. The capacitance pressure transducer recited in claim 1, wherein each of said inner and outer members is fabricated from a fused quartz material, and said inner member is aligned concentrically within said outer member.

3. The capacitance pressure transducer recited in claim 1, wherein said outer member is of hollow construction and said inner member is of solid construction.

4. The capacitance pressure transducer recited in claim 1, further comprising a pressure dome spaced from the respective first ends of said inner and outer members, said pressure dome acting to protect said inner and outer members from damage and prevent a disturbance of the alignment of said inner member within said outer member.

5. The capacitace pressure transducer recited in claim 1, further comprising a pressure dome integrally formed with and extending outwardly from said inner member, said pressure dome acting to protect said inner and outer members from damage and, prevent a disturbance of the alignment of said inner member within said outer member.

6. The capacitance pressure transducer recited in claim 1, wherein each of the first ends of said inner and outer members are tapered, the taper of said first ends being such that said first ends engage one another, said joint being formed at the location of the engagement of said first ends.

7. The capacitance pressure transducer recited in claim 1, wherein each of the first ends of said inner and outer members are identically tapered and adapted to fit in flush engagement with one another to form said joint and preserve the alignment of said inner member within said outer member.

8. The capacitance pressure transducer recited in claim 1, further comprising a protective housing surrounding said outer cylindrical member and communicating with an area exterior of said housing, said housing being filled with fluid.

9. The capacitance pressure transducer recited in claim 1, further comprising temperature sensing means interfaced with each of said inner and outer members and responsive to the temperature of said members for providing an indication of a temperature difference therebetween.

10. The capacitance pressure transducer recited in claim 1, wherein said joint formed to connect the first ends of said inner and outer members includes a solder mixture.

11. The capacitance pressure transducer recited in claim 10, wherein said solder mixture includes an indium alloy solder.

12. The capacitance pressure transducer recited in claim 10, wherein said solder mixture includes a metal hydride flux.

13. The capacitance pressure transducer recited in claim 12, wherein said metal hydride flux is titanium hydride.

14. The capacitance pressure transducer recited in claim 10, further comprising a groove formed in a circumferential direction around the first end of said inner member, said groove receiving surplus solder mixture therein for preventing the flow of said mixture therepast.

15. For a capacitance pressure transducer comprising cylindrical inner and outer members having first and second ends and being separated from one another by a gap, the size of which gap is adapted to change as a function of pressure, and electrode means located at said inner and outer members and responsive to the size of said gap for providing an indication of pressure, a process for joining at least the first ends of each of said inner and outer members, said process comprising the steps of soldering said first ends together and mixing said solder with a metal hydride flux to enable said solder to adhere to and join said first ends.

16. The process for joining recited in claim 15, including the additional step of using an indium alloy solder for joining said first ends.

17. The process for joining recited in claim 15, including the additional step of using titanium hydride flux for mixing with said solder.

18. The process for joining recited in claim 15, including the additional steps of positioning said solder and flux at the gap between said inner and outer cylinder first ends, and
heating said inner and outer cylinders for forming a mixture of the solder and flux and establishing a continuous bond between said cylinder first ends.

19. The process of joining recited in claim 15, including the additional step of applying a mixture of metal hydride and amylacetate at the gap between said inner and outer cylinder first ends prior to the step of soldering said first ends together.

20. The process for joining recited in claim 15, including the additional steps of positioning said inner and outer members in concentric alignment relative to one another before the step of soldering, and forming each of said inner and outer members from a fused quartz material, so that a fused quartz-to-fused quartz joint is formed between the respective first ends thereof.

21. The process for joining recited in claim 15, including the additional steps of tapering each of the first ends of said inner and outer members, forming said tapers so that said first ends engage one another, and soldering said first ends together at the location of engagement.

* * * * *